United States Patent Office 2,972,616
Patented Feb. 21, 1961

2,972,616
PRODUCTION OF PYRIDINE

William I. Denton, Cheshire, Conn., assignor to Olin Mathieson Chemical Corporation, a corporation of Virginia No Drawing. Filed June 1, 1959, Ser. No. 817,057

5 Claims. (Cl. 260—290)

This invention relates to the preparation of pyridine and, more particularly, to a novel catalytic process for the production of pyridine.

Pyridine is an industrially important chemical primarily useful as an intermediate in the preparation of other chemical compounds having important applications in the pharmaceutical and chemical industries. Pyridine itself is useful as a solvent for organic materials such as fats and mineral oils and as a catlyst in certain specific organic reactions such as the hydration of olefins and the sulfonation of alcohols.

Pyridine is currently produced from coal tar which is a by-product of coking operations. Since the supply of coal tar is dependent upon the amount of coke prepared it is obvious that the amount of pyridine which can be obtained from this source is limited. Furthermore, the pyridine which is obtained as a by-product in the destructive distillation of coal tar is contaminated by various homologues which are formed at the same time. Hence, a separation problem is presented which entails considerable expense and inconvenience. Several synthetic methods for the preparation of pyridine have been reported. These generally involve either the reaction of acetaldehyde, methanol and ammonia or the reaction of oxygen-heterocyclic compounds with ammonia. In general, these methods have been unsatisfactory because of the poor yields of pyridine returned and because of the presnece of other nitrogen-heterocyclic compounds in the reaction mixture. Among such processes, tetrahydrofurfuryl alcohol has been reacted with ammonia in the presence of various catalytic agents. The most effective of the catalysts which have been employed in this reaction have been molybdena-alumina and chromia-alumina catalysts. Of these the molybdena-alumina returned the highest yield of pyridine but its use was accompanied by the formation of excessive amounts of coke. Hence, the period for effective use of this catalyst was limited and frequent regeneration of the catalyst was necessary. The possibility of demands for increased quantities of pyridine have fostered attempts to improve upon those processes already known and to devise new methods for the preparation of pyridine.

It is an object of the present invention to provide an improved process for the preparation of pyridine.

It is another object of this invention to provide an improved catalytic process for the preparation of pyridine.

It is a further object of this invention to provide a more effective process for the production of pyridine using a molybdenum catalyst.

Other objects will in part be obvious and will in part appear hereinafter.

It has been found that the above and other objects can be achieved by the process of the present invention in which a minor proportion of potassium oxide is added to the molybdena-alumina catalyst employed in effecting the reaction between tetrahydrofurfuryl alcohol and ammonia. The presence of the small amount of potassium oxide greatly reduces the amount of coke which is formed in the course of the reaction without adversely affecting the yield of pyridine which is realized. According to the preferred embodiment of the invention, tetrahydrofurfuryl alcohol and ammonia in the mole ratio of 1 to 5 are reacted at a temperature of 525° C. and atmospheric pressure in the presence of a catalyst comprising 10% molybdena and 2% potassium oxide on an alumina support.

While the above conditions represent those which will be employed for achievement of optimum results, other proportions and operating conditions can be employed without departing from the spirit and scope of the invention as disclosed and claimed herein. Thus, the temperature can be varied from about 400° C. to about 600° C., although the preferred temperature of reaction is from about 450° C. to about 550° C. The particular temperature employed will of course depend to some degree upon the other conditions of reaction. For example, higher temperatures will be employed at short residence times whereas lower temperatures will be employed at longer residence times.

The reaction can be carried out under atmospheric, super-atmospheric and sub-atmospheric pressures. Pressures ranging from about 0.1 to about 20 atmospheres can be employed, although the preferred range of pressure is from about 0.5 to about 10 atmospheres.

The mole ratio of ammonia to tetrahydrofurfuryl alcohol can be varied over a range of from about 2 moles of ammonia to 1 of tetrahydrofurfuryl alcohol to about 10 moles of ammonia to 1 mole of tetrahydrofurfuryl alcohol. However, the preferred mole ratios of ammonia to tetrahydrofurfuryl alcohol are in the range of from about 3 to 1 to 7 to 1. At lower molar ratios the process operates satisfactorily but large amounts of the more expensive tetrahydrofurfuryl alcohol have to be processed, while at higher molar ratios the cost of handling and recovering additional ammonia becomes prohibitive.

Space velocity as used herein is liquid hourly space velocity. It is defined as the volume of tetrahydrofurfuryl alcohol which is supplied to the reaction zone per hour per unit volume of catalyst employed. The space velocity can be varied from about 0.1 to about 10, and is preferably maintained at from 0.3 to 2.0. It should be noted that the space velocity is based upon the principal reactant and is, therefore, not necessarily related to residence time since variations in the mole ratios of reactant or in the pressure can change the residence time without affecting the space velocity.

The catalyst comprises an oxide of molybdenum on a support. Examples of suitable supports are basic or neutral supports such as zinc spinels, basic aluminum phosphates, magnesia-silica, magnesia, florisil and bauxite. Preferably, however, activated alumina will be employed as the support.

The promoter which is employed for most effective operation is the oxide of potassium. The concentration of promoter in the improved catalyst employed in the process of the present invention may be varied from about 0.1% to about 15%. The preferred range is from about 1% to 5%.

In order to more fully illustrate the invention the following examples are provided. However, it is to be understood that such examples are for the purpose of illustration only and are not to be construed as limiting in any way the scope of the present invention.

EXAMPLE I

*Preparation of catalyst*

50 grams of ammonium molybdate were dissolved in 20 cc. of ammonia hydroxide and 100 cc. of distilled water in which 7 grams of potassium hydroxide had previously been dissolved. This solution was added in regular increments to a flask containing 250 grams of 4-8 mesh activated alumina maintained under vacuum. After the addition of all of the molybdate solution the flask was permitted to stand for 1 hour at room temperature and the contents thereof were then removed and dried in an oven at 125° C. for 12 hours. Following this, the dried material was heated in a muffle furnace at 450° C. for a period of 18 hours.

A number of runs were made using the catalyst prepared as above in promoting formation of pyridine from the reaction at atmospheric pressure of tetrahydrofurfuryl alcohol and ammonia. The results obtained from a number of these and related runs are given in the following tabulation.

| Run No. | 1 | 2 | ²3 | 4 |
|---|---|---|---|---|
| Operating Conditions: | | | | |
| (a) Temperature, °C | 475 | 500 | 500 | 512 |
| (b) Space Velocity, v./hr./v | 1.0 | 0.5 | 0.5 | 0.5 |
| (c) Residence Time, seconds | 0.9 | 1.3 | 1.6 | 1.3 |
| (d) Molar Ratio, $NH_3$:THFA¹ | 5:0 | 7:4 | 5:1 | 7:8 |
| (e) Length of Run, Hrs.-Min | 2-30 | 6-0 | 5-0 | 6-15 |
| Yield, Mole percent Based on THFA:¹ | | | | |
| (a) Pyridine, per pass | 32 | 45 | 47 | 46 |
| (b) Pyridine, ultimate | 48 | 57 | 64 | 56 |
| (c) Coke on Catalyst, per pass | 2.2 | 3.5 | 5.1 | 2.7 |

¹ THFA—Tetrahydrofurfuryl alcohol.
² Run No. 3 was carried out with a molybdena alumina catalyst substantially the same as that used for the other runs except that it contained no potassium oxide promoter.

It is evident from the results given above that the inclusion of a small percentage of the potassium oxide promoter results in a large increase in the efficiency of the catalytic process with regard to reduction in the extent of coke formation.

EXAMPLE II

A catalyst was prepared substantially according to the procedure given in Example I with the exception that sodium hydroxide was used in place of potassium hydroxide. There resulted a catalyst having 10% $MoO_3$ on activated alumina, and 2% of $Na_2O$. A number of runs were made in which this catalyst was used and in which tetrahydrofurfuryl alcohol was reacted at atmospheric pressure with ammonia under the conditions given in the following tabulation:

| Run No. | 5 | 6 |
|---|---|---|
| Operating Conditions: | | |
| (a) Temperature, °C | 500 | 475 |
| (b) Space Velocity, v./hr./v | 0.5 | 0.5 |
| (c) Residence Time, seconds | 1.8 | 1.9 |
| (d) Molar Ratio, $NH_3$:THFA | 5:1 | 5:1 |
| (e) Length of Run, Hr.-Min | 6.0 | 6.0 |
| Yield Mole percent based on THFA: | | |
| (a) Pyridine, per pass | 21 | 19 |
| (b) Pyridine, ultimate | 30 | 30 |
| (c) Coke on Catalyst, per pass | 5.3 | 5.1 |

In run No. 5 there was an accidental loss of some ammonia. However, the yield value determined is substantially correct. It is evident from these values that a molybdena-alumina catalyst containing sodium oxide does not give lower coking values than are obtained using the molybdena-alumina catalyst alone (compare with run 3 of Example I). In addition it is apparent from this comparison that the yield of pyridine is significantly lower.

As used herein the term potassium oxide includes any of the oxides of potassium which result from preparation of the catalyst by procedures substantially as described in Example I and accordingly may include a portion of potassium hydroxide admixed with the oxides. A potassium compound such as potassium carbonate, which is converted to the oxide by the catalyst preparation process can also be employed. The catalyst may accordingly contain small residual amounts of these substances.

The above is a continuation-in-part of application for patent Serial Number 677,215, filed August 9, 1957, and now abandoned.

Since many examples of the foregoing procedures and articles may be carried out and made, and since many modifications can be made in the procedures and articles described without departing from the scope of the subject invention, the foregoing is to be interpreted as illustrative only, and not as defining or limiting the scope of the invention.

What is claimed is:

1. A process for the preparation of pyridine which comprises reacting ammonia with tetrahydrofurfuryl alcohol in the mole ratio of from about 2 to 1 to about 10 to 1 at a temperature of from about 450° C. to about 550° C., a pressure of from about 0.1 to 20 atmospheres and a space velocity of from about 0.1 to about 10 in the presence of a catalyst consisting essentially of from about 2 to 20% of a molybdenum oxide and from about 0.1 to about 15% of potassium oxide, on a support selected from the group consisting of neutral and basic supports.

2. A process according to claim 1 in which the molybdenum oxide is molybdenum trioxide.

3. A process according to claim 2 in which the support is alumina.

4. A process according to claim 3 in which the catalyst contains about 2% potassium oxide.

5. A process for the preparation of pyridine which comprises reacting 5 moles of ammonia with 1 mole of tetrahydrofurfuryl alcohol at a temperature of 500° C., atmospheric pressure and a space velocity of 0.5 in the presence of a catalyst consisting essentially of 10% of molybdena and 2% of potassium oxide on an activated alumina support.

References Cited in the file of this patent

UNITED STATES PATENTS

| 2,478,675 | Tamele et al. | Aug. 9, 1949 |
| 2,543,424 | Spillane et al. | Feb. 27, 1951 |